United States Patent
Benny

(10) Patent No.: US 9,602,334 B2
(45) Date of Patent: Mar. 21, 2017

(54) INDEPENDENT NETWORK INTERFACES FOR VIRTUAL NETWORK ENVIRONMENTS

(71) Applicant: International Business Machines Corporation, Armonk, NY (US)

(72) Inventor: Stephan Benny, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 13/747,051

(22) Filed: Jan. 22, 2013

(65) Prior Publication Data

US 2014/0207926 A1    Jul. 24, 2014

(51) Int. Cl.
| | | |
|---|---|---|
| G06F 17/50 | (2006.01) | |
| H04L 12/56 | (2006.01) | |
| H04L 12/24 | (2006.01) | |
| G06F 9/455 | (2006.01) | |
| H04L 12/931 | (2013.01) | |

(52) U.S. Cl.
CPC ...... H04L 41/0213 (2013.01); G06F 9/45558 (2013.01); *G06F 2009/45595* (2013.01); *H04L 49/70* (2013.01)

(58) Field of Classification Search
CPC .......................... H04L 41/0213; G06F 9/45558
USPC ....................................................... 709/223
See application file for complete search history.

(56) References Cited

U.S. PATENT DOCUMENTS

| | | | | |
|---|---|---|---|---|
| 7,496,955 B2 * | 2/2009 | Akundi | ............. | H04L 45/308 |
| | | | | 370/392 |
| 7,673,080 B1 * | 3/2010 | Yu | ............. | G06F 13/385 |
| | | | | 710/300 |
| 7,984,123 B2 | 7/2011 | Tripathi | | |
| 8,194,667 B2 * | 6/2012 | Belgaied | ............. | H04L 49/90 |
| | | | | 370/392 |
| 8,675,644 B2 | 3/2014 | Tripathi | | |
| 8,893,125 B2 | 11/2014 | Shah | | |
| 8,972,611 B2 | 3/2015 | Galles | | |
| 9,185,053 B2 | 11/2015 | Polcyn | | |
| 9,363,207 B2 | 6/2016 | Mittal | | |

(Continued)

OTHER PUBLICATIONS

Mell, P. et al., "The NIST Definition of Cloud Computing", Special Publication, Version 15, Oct. 7, 2009, 2 pages, National Institute of Standards and Technology, Information Technology Laboratory, USA.

(Continued)

*Primary Examiner* — Kevin Bates
*Assistant Examiner* — Golam Mahmud
(74) *Attorney, Agent, or Firm* — Sherman IP LLP; Kenneth L. Sherman; Steven Laut

(57) ABSTRACT

Embodiments of the invention relate to providing network independent network interfaces. One embodiment includes a networking system. The networking system includes a physical networking device connected to one or more underlying networks. A primary switch and a secondary switch are each connected to the physical networking device. A connectivity module creates a root interface for a first device. Virtual network interface cards (vNICs) are added to the root interface by the connectivity module. The root interface is a single access point for accessing the underlying networks. The first device is a virtual machine (VM) or a server with more than one network interface.

13 Claims, 8 Drawing Sheets

(56) References Cited

U.S. PATENT DOCUMENTS

| | | | |
|---|---|---|---|
| 2006/0041667 A1* | 2/2006 | Ahn | H04L 12/5693 709/229 |
| 2006/0070066 A1* | 3/2006 | Grobman | H04L 63/1441 718/1 |
| 2008/0192648 A1* | 8/2008 | Galles | H04L 69/32 370/254 |
| 2009/0022167 A1* | 1/2009 | Yumoto | H04L 45/48 370/401 |
| 2009/0144410 A1* | 6/2009 | Fink | H04L 63/1425 709/224 |
| 2011/0093251 A1* | 4/2011 | Belgaied | G06F 17/509 703/13 |
| 2011/0106975 A1 | 5/2011 | Inomata | |
| 2011/0320632 A1* | 12/2011 | Karino | H04L 45/586 709/238 |
| 2012/0131300 A1* | 5/2012 | Graham | G06F 9/5077 711/170 |
| 2012/0284712 A1* | 11/2012 | Nimmagadda | G06F 9/5077 718/1 |
| 2012/0324442 A1* | 12/2012 | Barde | H04L 49/70 718/1 |
| 2013/0188497 A1 | 7/2013 | Perez | |
| 2014/0056302 A1* | 2/2014 | Benny | H04L 45/64 370/392 |
| 2014/0108584 A1* | 4/2014 | Lu | H04L 47/76 709/208 |
| 2014/0112205 A1* | 4/2014 | Prakash | H04L 12/4625 370/256 |

OTHER PUBLICATIONS

U.S. Notice of Allowance for U.S. Appl. No. 14/072,325 mailed Nov. 9, 2016.

* cited by examiner

INDEPENDENT NETWORK INTERFACES FOR VIRTUAL NETWORK ENVIRONMENTS

BACKGROUND

Embodiments of the invention relate to virtual networks including network interfaces, and in particular, providing network independent network interfaces.

A virtual network appliance (VNA) is a virtual machine (VM) that provides specialized networking services. When a VNA has multiple virtual network interface cards (vNICs), each vNIC must be connected to an appropriate virtual switch or virtual-switch port. Each vNIC may also require connectivity with different network properties, such as virtual local area network (VLAN), or Internet Protocol (IP) Subnets.

BRIEF SUMMARY

Embodiments of the invention relate to providing network independent network interfaces. One embodiment includes a networking system. The networking system includes a physical networking device connected to one or more underlying networks. A primary switch and a secondary switch are each connected to the physical networking device. A connectivity module creates a root interface for a first device. Virtual network interface cards (vNICs) are added to the root interface by the connectivity module. The root interface is a single access point for accessing the underlying networks. The first device is a virtual machine (VM) or a server with more than one network interfaces.

Another embodiment comprises a computer program product for providing network independent network interfaces. The computer program product comprising: a computer readable storage medium having computer readable program code embodied therewith. The computer readable program code comprising: computer readable program code configured to create a root interface in a first device in a network system. Computer readable program code is configured to add virtual network interface cards (vNICs) to the root interface. The first device executes network services on the root interface. The root interface is a single access point for accessing a plurality of underlying networks. The first device is one of a virtual machine (VM) and a server with more than one network interfaces.

These and other features, aspects, and advantages of the present invention will become understood with reference to the following description, appended claims and accompanying figures.

DETAILED DESCRIPTION

Figure 1:
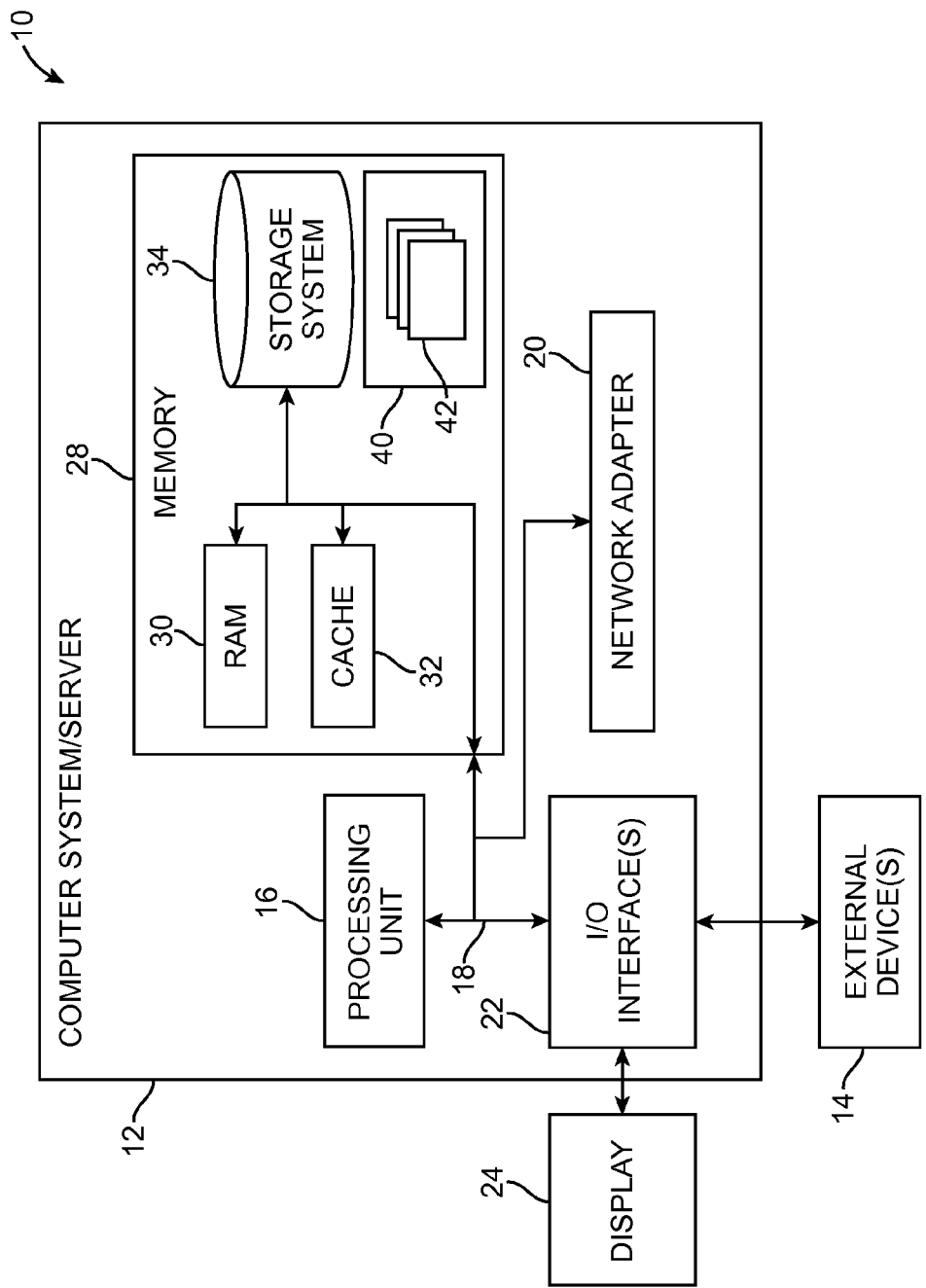
FIG. 1 depicts a cloud computing node according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
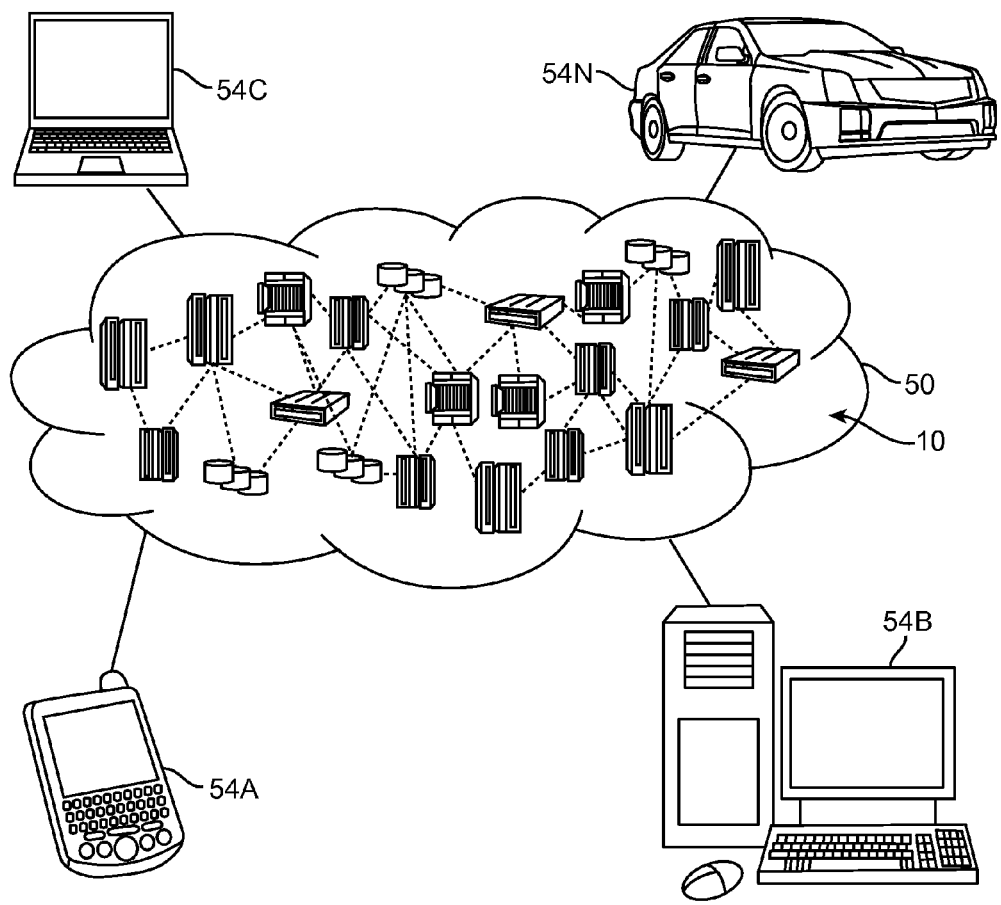
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
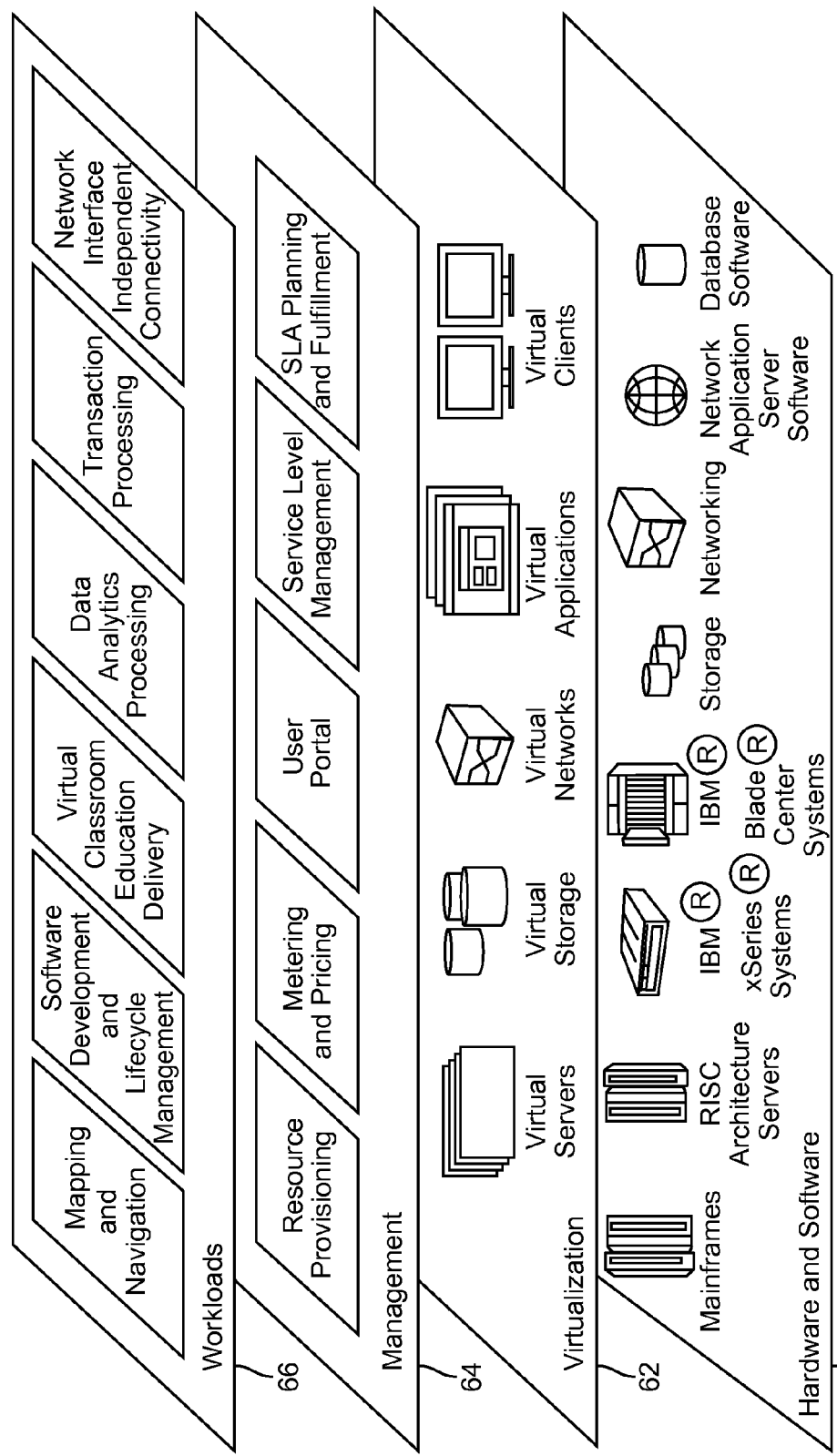
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM™ zSeries™ systems and RISC (Reduced Instruction Set Computer) architecture based servers. In one example, IBM pSeries™ systems, IBM xSeries™ systems, IBM BladeCenter™ systems, storage devices, networks, and networking components. Examples of software components include network application server software. In one example, IBM WebSphere™ application server software and database software. In one example, IBM DB2™ database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and network interface independent connectivity. As mentioned above, all of the foregoing examples described with respect to FIG. 3 are illustrative only, and the invention is not limited to these examples.

It is understood all functions of the present invention as described herein are typically performed by the network independent network interface system 500 (FIG. 5), which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

According to an embodiment of the invention, a networking system includes a physical networking device connected to one or more underlying networks. A primary switch and a secondary switch are each connected to the physical networking device. A connectivity module creates a root interface for a first device. Virtual network interface cards (vNICs) are added to the root interface by the connectivity module. The root interface is a single access point for accessing the underlying networks. The first device is a virtual machine (VM) or a server with more than one network interfaces.

Figure 4:
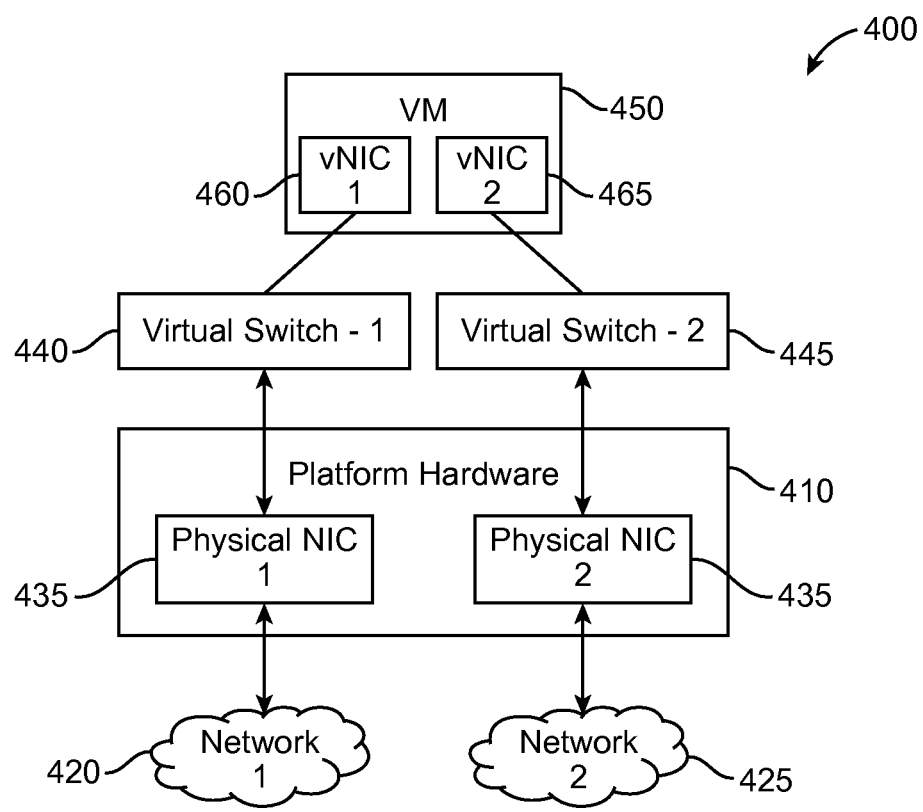
FIG. 4 is a block diagram illustrating a virtual network system for employing an embodiment of the present invention.

FIG. 4 shows a block diagram illustrating a virtual network system 400 for employing an embodiment of the present invention. The virtual network system 400 includes a platform hardware 410 (e.g., a server, a computer, etc.) that includes physical NICs, such as physical NIC 1 435 and physical NIC 2 435. The physical platform 410 is connected to network 1 420 via physical NIC 1 435 and connected to network 2 425 via physical NIC 2 435. The physical NIC 1 435 is connected to a virtual switch (VS) 1 440, and the physical NIC 2 435 is connected to a VS 2 445. The VS 1 440 is connected to a vNIC 1 460 of the VM 450, and the VS 2 445 is connected to the vNIC 2 465 of the VM 450. It should be noted that multiple VMs may be connected to the network 1 420 and the network 2 425 through other VS's and physical NICs of the platform hardware 410.

A virtual machine manager (hypervisor) allows multiple operating systems (e.g., VMs, such as VM 450) to run concurrently on a host computer, e.g., platform hardware 410. A hypervisor provides abstraction of physical resources to the VMs (e.g., VM 450). For example, the physical NIC 1 435 is abstracted as the vNIC 1 460, and the physical NIC 2 435 is abstracted as the vNIC 2 465. A VM (e.g., VM 465) may be configured with multiple vNICs (e.g., vNIC 1 460 and vNIC 2 465) that each connect to different networks (e.g., network 1 420 and network 2 425). A VS (e.g., VS 1 440, VS 2 445) is a software abstraction of an Ethernet switch in the hypervisor for providing connectivity for VMs (e.g., VM 450).

It is important to connect a vNIC (e.g., vNIC 1 460 and vNIC 2 465) to appropriate VS's (e.g., VS 1 440 and VS 2 445) to ensure desired connectivity. In one example, consider an error case in which vNIC 1 460 is assigned an IP from the network 1 420 subnet and mistakenly connected to the VS 2 445. In this case, the VMs connectivity to network 1 420 is broken. A virtual network appliance (VNA) is a VM that provides specialized networking services. When a VNA has multiple vNICs, it is important to connect each vNIC to an appropriate VS or VS port. Each vNIC may require connectivity with different network properties, such as VLAN, IP-subnets, etc. One way to provide connectivity is to manually note down a media access control (MAC) address of each vNIC and connect to the appropriate VS or VS port. For example, if a vNIC is connected to a port in VLAN (e.g., port x) then, care should be taken to assign vNICs an IP address in that VLAN to ensure connectivity. If there are many such VNAs; this becomes a difficult task. Additionally, sometimes VMs do not obtain consistent information from a hypervisor upon a reboot. A MAC address assigned to one vNIC may get assigned to a different vNIC after a VM reboots. This situation breaks the VNA's operation if the MAC address is used to map some services/information in its configuration.

Figure 5:
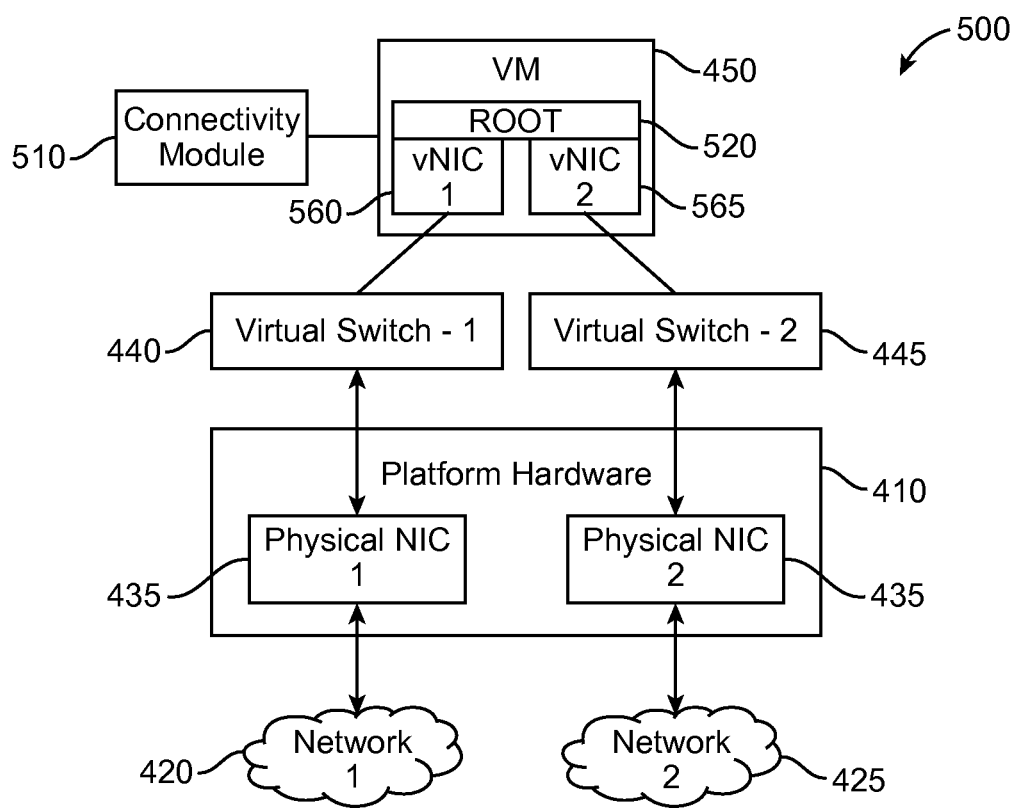
FIG. 5 illustrates a block diagram of a virtual network system providing network independent network interfaces, in accordance with an embodiment of the invention.

FIG. 5 illustrates a block diagram illustrating a virtual network system 500 including a connectivity module 510, in accordance with an embodiment of the invention. The virtual network system 500 includes a platform hardware 410 (e.g., a server, a computer, etc.) that includes physical NICs, such as physical NIC 1 435 and physical NIC 2 435. The physical platform 410 is connected to network 1 420 via physical NIC 1 435 and connected to network 2 425 via physical NIC 2 435. The physical NIC 1 435 is connected to a VS 1 440, and the physical NIC 2 435 is connected to a VS 2 445. The VS 1 440 is connected to a vNIC 1 560 of the VM 450, and the VS 2 445 is connected to the vNIC 2 565 of the VM 450. It should be noted that multiple VMs may be connected to the network 1 420 and the network 2 425 through other VS's and physical NICs of the platform hardware 410.

In one embodiment, the connectivity module 510 creates a root interface 520 for the VM 450, and adds multiple vNICs (e.g., vNIC 1 560, vNIC 2 565) to the root interface 520. In this embodiment, the root interface 520 is a single access point for accessing the underlying networks (e.g., network 1 420 and network 2 425), and the VM 450 executes network services on the root interface 520. In one example, instead of the VM 450 being used for adding the multiple vNICs, the connectivity module 510 uses a server with more than one network interface and adds the root interface 520 with the network interfaces being connected to the root interface 520 similarly as shown with the VM 450.

In one embodiment, the root interface 520 comprises a logical parent interface for all vNICs (e.g., vNIC 1 560, vNIC 2 565). The vNICs comprise child interfaces of the root interface 520. In one example, the connectivity module 510 provides for connecting a vNIC (e.g., vNIC 1 560, vNIC 2 565) added to the root interface 520 to any VS or VS port in the network system. In this example, the added vNIC is considered as a "leaf" of a tree where the root interface 520 is considered a "root" of the tree. In one example, the vNICs (e.g., vNIC 1 560, vNIC 2 565) connectivity is transparent to the underlying networks (e.g., network 1 420 and network 2 425), and the VM 450 may communicate to all of the connected networks (e.g., network 1 420 and network 2 425) via the root interface 520.

In one embodiment, the root interface 520 is the single point for entry/exit for accessing multiple underlying networks (e.g., network 1 420 and network 2 425) through its children. In one example, based on the use of the root interface 520 and children vNICs (e.g., vNIC 1 560, vNIC 2 565), there is no need to keep track of vNICs' connectivity to the underlying networks. In one example, an administrator may connect one vNIC to each VS or VS port and assign network properties (e.g., IP) to the root interface 520.

In one embodiment, the connectivity module 510 provides for the VM 450 receiving a packet comprising a MAC address, creating a table for mapping the MAC address to vNICs (e.g., vNIC 1 560, vNIC 2 565), and selecting a vNIC for communicating to an underlying network (e.g., network 1 420 and network 2 425) based on a destination address. In one example, internally generated broadcast packets from the VM 450 are forwarded to all child vNICs (e.g., vNIC 1 560, vNIC 2 565) without forwarding broadcast packets between the child vNICs. In one example, upon a vNIC being added to the root interface 520, the vNIC learns and maintains information about the underlying network. In one example, the information may include a MAC address, an IP address, etc. In one example, the information is used to choose which vNIC to reach (i.e., communicate) in an underlying network. In one example, the vNIC learns the MAC address from received packets and maintains a table that maps MAC addresses to vNICs. In one example, the table is used to select an egress vNIC based on a destination MAC address. Internally generated broadcast packets (e.g., address resolution protocol (ARP) packets) are forwarded to all child vNICs. In one embodiment, internally generated broadcast packets are never forwarded between child vNICs.

In one embodiment, creating the root interface 520 comprises the connectivity module 510 using a device driver. In one example, the device driver provides adding other vNICs (e.g., vNIC 1 560, vNIC 2 565) as child interfaces to the root interface 520. In one example, a packet received on a child vNIC (e.g., vNIC 1 560, vNIC 2 565) passes through the root interface 520 prior to reaching an operating system (OS) networking stack of the VM 450.

In one embodiment, creating the root interface 520 comprises the connectivity module 510 using a bridge module or device in support of a kernel bridge infrastructure. In one example, the bridge module or device creates a bridge interface and adds and removes ports to and from the bridge interface. The bridge interface acts as the root interface 520. The vNICs (e.g., vNIC 1 560, vNIC 2 565) are added as ports of the bridge module or device and are child interfaces to the root interface 520. The kernel bridge infrastructure is modified to prevent the forwarding of broadcast packets between bridge ports.

Figure 6:
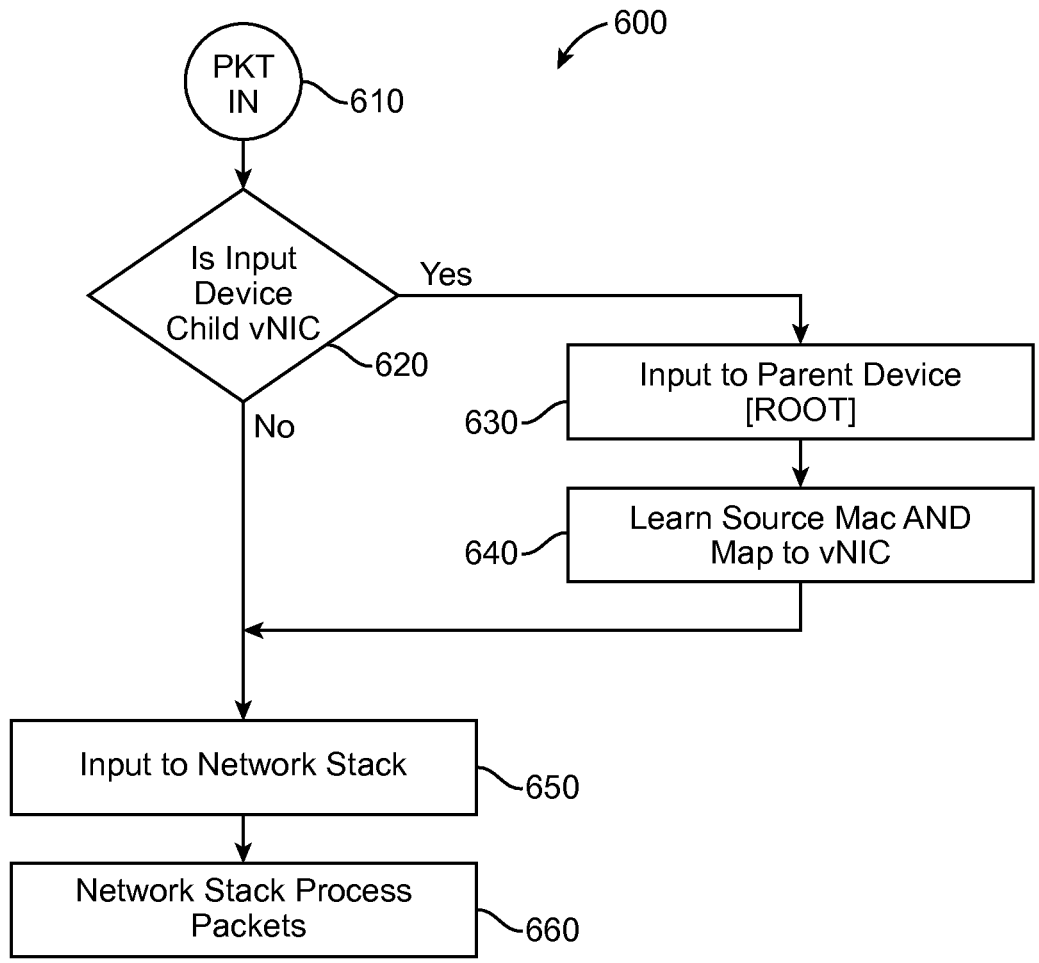
FIG. 6 illustrates a flow diagram for creating a root interface, in accordance with an embodiment of the invention.

FIG. 6 illustrates a flow diagram for a process 600, in accordance with an embodiment of the invention. Process 600 relates to using a device driver for creating a logical root device (i.e., root interface 520), which may add other logical devices (e.g., vNICs) as children. In one embodiment, a packet is received by the system (e.g., system 500) at block 610. At block 620, it is determined whether the targeted input device is a child vNIC (e.g., vNIC 1 560, vNIC 2 565). If it was determined that the target input device is not a child vNIC, then the process 600 proceeds to block 650. If it is determined that the targeted input device is a child vNIC, the packet is input to the parent device (e.g., root interface 520) at block 630. The source MAC address is learned at block 640 and the flow proceeds to block 650.

In block 650, the packet is input to the network stack. At block 660, the network stack processes the received packet(s). In one embodiment, packets input to child vNICs (e.g., vNIC 1 560, vNIC 2 565) pass through the parent device (e.g., the root interface 520) before reaching an operating system (OS) networking stack of the networking system (e.g., system 500). In this embodiment, the OS interprets that the packet was received on the root interface 520. Since network properties are assigned to the root interface 520, the rest of the processing is performed as if the packet is received on the root interface 520. This enables the VM (e.g., VM 450) to perform network operations independent of the vNICs (e.g., vNIC 1 560, vNIC 2 565) connectivity. Similarly, the OS uses the root interface 520 to send packets. In one example, the root interface 520 device driver selects a child vNIC based on the learned information (e.g., MAC address, IP address, etc.) to vNIC mapping. The root interface 520 then uses a child vNIC to send one or more packets out.

Figure 7:
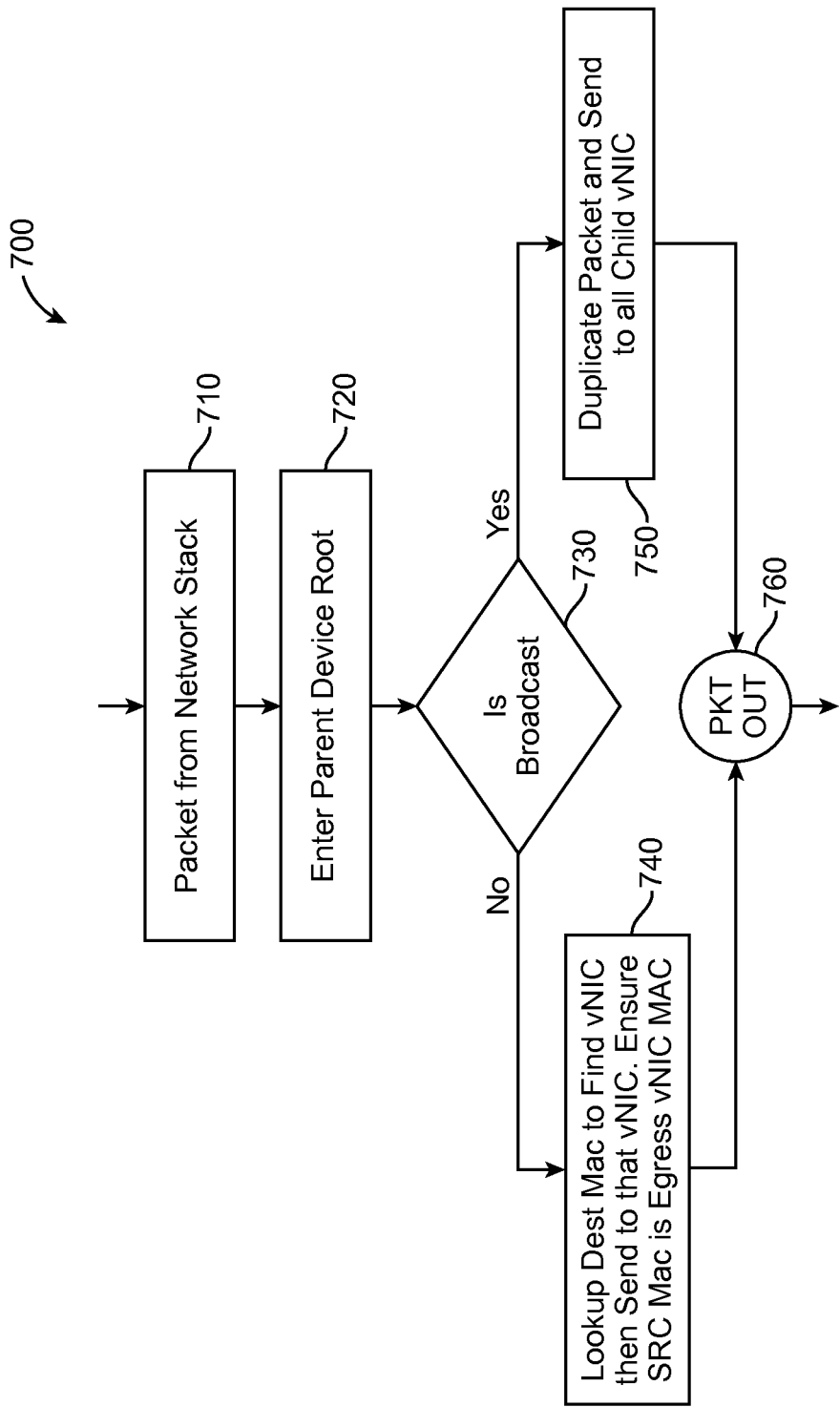
FIG. 7 illustrates another flow diagram for creating a root interface, in accordance with an embodiment of the invention.

FIG. 7 illustrates a flow diagram for a process 700, in accordance with an embodiment of the invention. Process 700 relates to using a bridge module or device for creating a logical root device (i.e., root interface 520), which may add other logical devices (e.g., vNICs) as children. In one example, the bridge module or device is available on existing OSs, for example, LINUX/BSD (Berkeley Software Distribution). In this case, the kernel bridge infrastructure is used to form a parent-child relationship between a root device (e.g., the root interface 520) and vNICs (e.g., vNIC 1 560, vNIC 2 565).

In one embodiment, the following components/functions support the flow diagram 700. The bridge module or device is supported in the kernel. A bridge-utility tool manages the bridge module operations, such as creating a bridge interface, add/remove ports to/from the bridge interface, and the network properties (e.g., IP addresses) are assigned to the bridge interface and are reachable via all ports of the bridge. In one embodiment, the bridge interface acts as the root interface, and vNICs are added as ports of the bridge and act as the children. The bridge learns the MAC address on each port and selects a proper vNIC for egress packets. Kernel space software is required to modify normal behavior of the bridge. This software implements netfilter hooks and performs the following: a) prevents forwarding of broadcast packets between bridge ports; and b) sets the source MAC of an egress packet to a corresponding MAC address of a vNIC. With the use of the above components/functionality, a network independent vNIC may be provided for in Linux/BSD VMs.

In one embodiment, a packet is received from the network stack of the system (e.g., system 500) at block 710. At block 720, the root interface device is created. In block 730, it is determined whether the packet is a broadcast packet. If it is determined that the packet is a broadcast packet, the process 700 proceeds to block 740, otherwise the process 700 proceeds to block 750.

In block 740, the destination MAC address is looked up in a table to find the associated vNIC. Once the associated vNIC is found, the packet is sent to the associated vNIC. This assures that the source MAC address is the egress vNIC for the MAC address. In block 750, the received packet is duplicated and sent to all children vNICs. In block 760, the packets are output to the appropriate vNIC.

Figure 8:
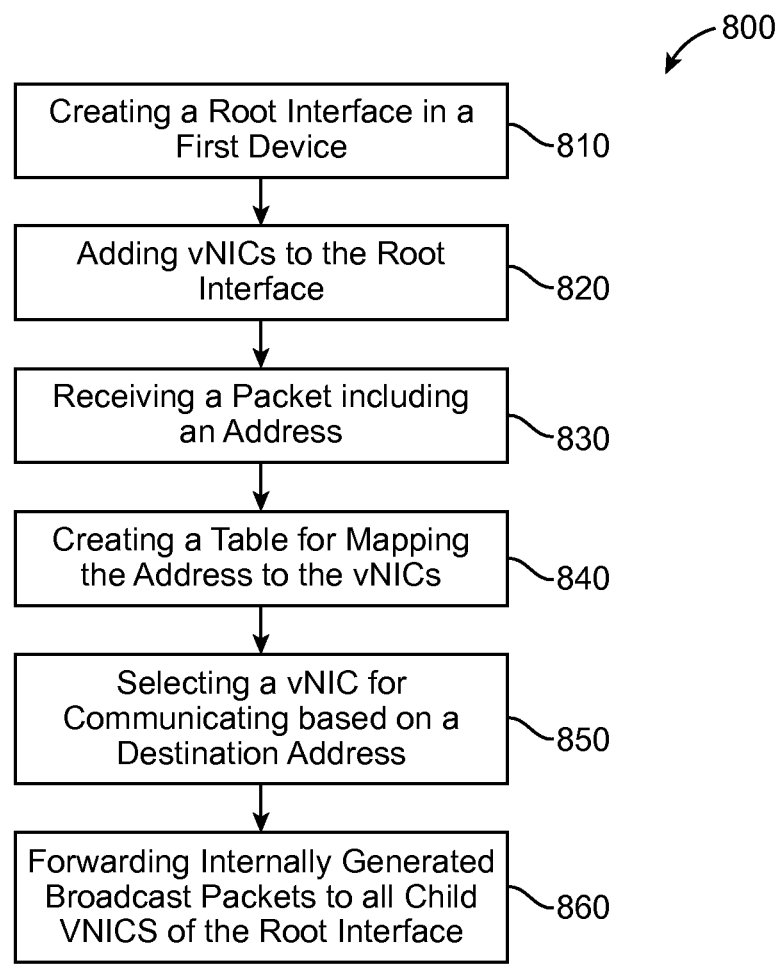
FIG. 8 is a block diagram showing a process for providing network independent network interfaces, in accordance with an embodiment of the invention.

FIG. 8 illustrates a flowchart of an example process 800 providing network independent network interfaces according to one embodiment. In process block 810, a root interface is created in a first device (e.g., VM 450) in a network system (e.g., system 500), for example, by the connectivity module 510 of system 500 shown in FIG. 5. In process block 820, vNICs (e.g., vNIC 1 560, vNIC 2 565) are added to the root interface (e.g., root interface 520). The first device executes network services on the root interface, and the root interface is a single access point for accessing underlying networks (e.g., network 1 420 and network 2 425).

In block 830, a packet is received including an address, such as a MAC address, an IP address, etc. In block 840, a table is created for mapping the address to the added vNICs. In block 850, a vNIC is selected for communicating packets based on a destination address (e.g., a MAC destination address). In block 860, internally generated broadcast packets are forwarded to all child vNICs of the root interface. In one example, a vNIC added to the root interface is connected to any VS or VS port in the network system, and the vNICs' connectivity is transparent to the underlying networks. In one example, creating the root interface in process 800 further includes using a device driver. The device driver provides adding other vNICs as child interfaces to the root interface, and a packet received on a child vNIC passes through the root device prior to reaching an operating system (OS) networking stack.

In another embodiment, process 800 further includes creating of the root interface by: providing a bridge module in support of a kernel bridge infrastructure, managing bridge module operations using a bridge utility tool, creating a bridge interface, and adding and removing ports to and from the bridge interface. In this example, the bridge interface acts as the root interface, and the vNICs are added as ports of the bridge module and are child interfaces to the root interface. In one example, the kernel bridge infrastructure is modified to prevent the forwarding of broadcast packets between bridge ports.

The system 500 may include one or more source programs, executable programs (object code), scripts, or any other entity comprising a set of computer program instructions to be performed. When the system 500 includes a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can store the program for use by or in connection with the instruction execution system, apparatus, or device. The computer readable medium is an electronic, magnetic, optical, or semiconductor system, apparatus, device, or other physical device or means that can store a computer program for use by or in connection with a computer related system or method.

More specific examples (a non-exhaustive list) of the computer-readable medium would include the following: a portable computer diskette (magnetic or optical), a random access memory (RAM) (electronic), a read-only memory (ROM) (electronic), an erasable programmable read-only memory (EPROM, EEPROM, or Flash memory) (electronic), and a portable compact disc memory (CDROM, CD R/W) (optical).

Program code embodied on a computer readable medium may be transmitted using any appropriate medium, including but not limited to wireless, wireline, optical fiber cable, RF, etc., or any suitable combination of the foregoing.

In one embodiment, where the system 500 is implemented in hardware, the system 500 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:
1. A networking system comprising:
a physical networking device; and
a processor coupled with the physical networking device, the processor configured to:
create a root interface for a first device;
add a plurality of virtual network interface cards (vNICs) to the root interface; and
use a bridge device in support of a kernel bridge infrastructure, the kernel bridge infrastructure is modified using netfilter hooks to prevent forwarding of broadcast packets between bridge ports and to set a source media access control (MAC) address of an egress packet to a corresponding MAC address of a vNIC; wherein:
the root interface is a single access point that is configured to access one or more underlying networks through the plurality of vNICs,
network operations are executed on the root interface for the first device based on receiving packets through the plurality of vNICs, and
the first device is a virtual machine (VM) or a server with more than one network interface.

2. The system of claim 1, wherein:
the root interface is assigned network properties and comprises a logical parent interface for all vNICs;
processing is performed for the operating system (OS) of the first device as if the received packets are directly received on the root interface to enable the first device to perform the network operations independent of vNICs connectivity; and
each of the plurality of vNICs comprise child interfaces of the root interface.

3. The system of claim 2, wherein the processor is configured to:
connect a vNIC added to the root interface to any virtual switch (VS) or VS port in the network system, wherein the vNICs connectivity is transparent to the underlying networks;
receive a packet comprising an address;
create a table to map the address to vNICs; and
select a vNIC to communicate to an underlying network based on a destination address, wherein broadcast packets generated in the root interface are forwarded to child vNICs without forwarding broadcast packets between the child vNICs.

4. The system of claim 3, wherein the processor is configured to use a device driver to create the root interface, the device driver is configured to add other vNICs as child interfaces to the root interface, and a packet received on a child vNIC passes through the root interface prior to reaching a networking stack of the OS.

5. The system of claim 2, wherein:
the bridge device is configured to create a bridge interface and to add and remove ports to and from the bridge interface,
the bridge interface is configured to act as the root interface,
the vNICs are added as ports of the bridge device and are child interfaces to the root interface, and
based on the logical relationship between the root interface and all of the child interfaces, tracking by the first device of the plurality of vNICs connectivity to the one or more underlying networks is unnecessary.

6. A computer program product comprising a computer readable hardware storage medium having program code embodied therewith, the program code being executable by a processor to implement a method comprising:
creating, by the processor, a root interface in a first device in a network system;
adding, by the processor, virtual network interface cards (vNICs) to the root interface; and
using, by the processor, a bridge device in support of a kernel bridge infrastructure, the kernel bridge infrastructure is modified using netfilter hooks to prevent forwarding of broadcast packets between bridge ports and to set a source media access control (MAC) address of an egress packet to a corresponding MAC address of a vNIC; wherein:
network operations are executed on the root interface for the first device based on receiving packets through the vNICs,
the root interface is a single access point for accessing a plurality of underlying networks via the vNICs, and
the first device is one of a virtual machine (VM), or a server with more than one network interfaces.

7. The computer program product of claim 6, wherein the root interface comprises a logical parent interface for the vNICs, and the vNICs comprise child interfaces of the root interface.

8. The computer program product of claim 7, wherein the method further comprises:
connecting, by the processor, a vNIC added to the root interface to a virtual switch (VS) or VS port in the network system, wherein the vNICs connectivity is transparent to the underlying networks;
receiving, by the processor, a packet comprising an address;
creating, by the processor, a table for mapping the address to vNICs;
selecting, by the processor, a vNIC for communicating to an underlying network based on a destination address; and
forwarding, by the processor, broadcast packets generated in the root interface to child vNICs without forwarding broadcast packets between the child vNICs.

9. The computer program product of claim 6, wherein creating of the root interface comprises using a device driver, the device driver provides adding other vNICs as child interfaces to the root interface, a packet received on a child vNIC passes through the root device prior to reaching networking stack of an operating system (OS) of the first device, and processing is performed for the OS of the first device as if the received packets are directly received on the root interface to enable the first device to perform the network operations independent of the vNICs connectivity.

10. The computer program product of claim 6, wherein creating of the root interface comprises:
providing, by the processor, the bridge device in support of the kernel bridge infrastructure;
managing, by the processor, bridge device operations using a bridge utility tool;
creating, by the processor, a bridge interface; and
adding and removing ports, by the processor, to and from the bridge interface, wherein the bridge interface acts as the root interface, and the vNICs are added as ports of the bridge device and are child interfaces to the root interface.

11. The system of claim 1, further comprising a primary switch and a secondary switch each coupled to the physical networking device.

12. The system of claim 1, wherein a vNIC is configured to learn and to maintain information about the one or more underlying networks in response to being added to the root interface.

13. The computer program product of claim 6, wherein a vNIC is configured to learn and to maintain information about the one or more underlying networks in response to being added to the root interface.

* * * * *